May 30, 1950 G. HERZOG 2,509,344
THICKNESS MEASUREMENT
Filed May 5, 1947
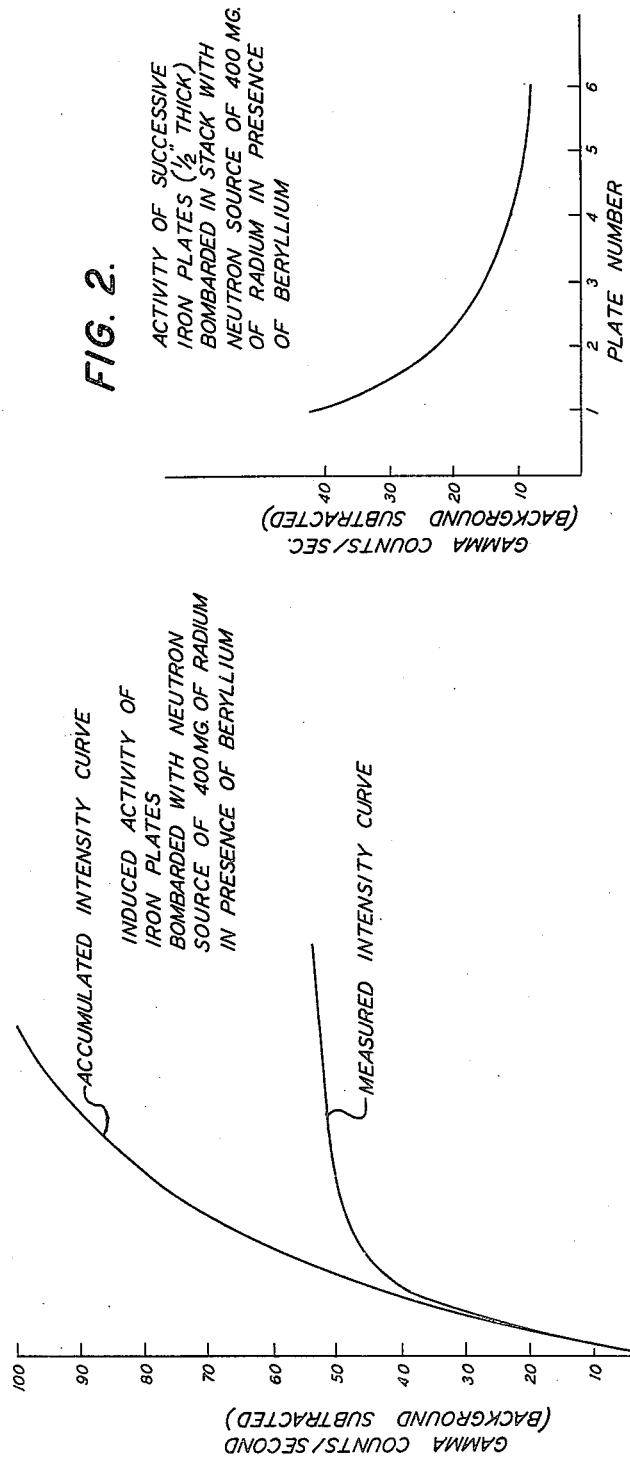
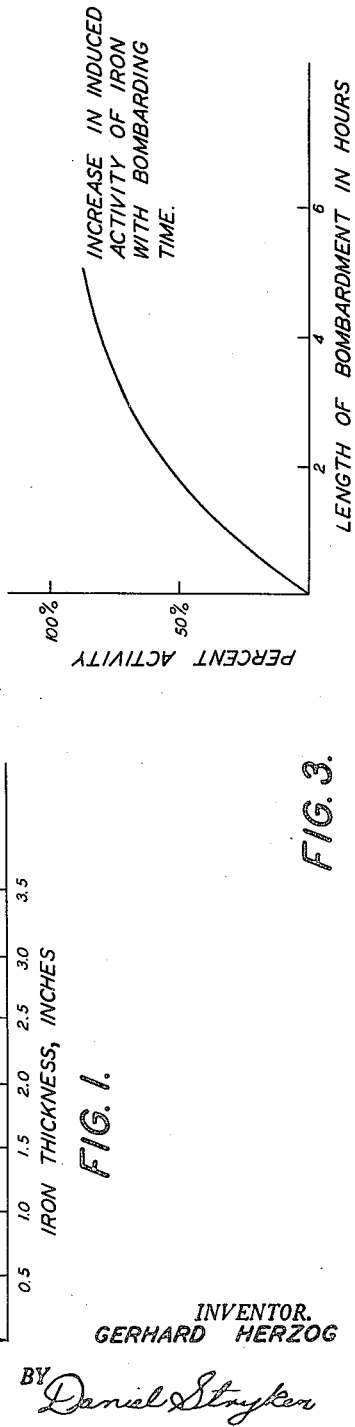
INVENTOR.
GERHARD HERZOG
BY Daniel Stryker
ATTORNEY Patented May 30, 1950

2,509,344

UNITED STATES PATENT OFFICE 2,509,344

THICKNESS MEASUREMENT

Gerhard Herzog, Houston, Tex., assignor to The Texas Company, New York, N. Y., a corporation of Delaware Application May 5, 1947, Serial No. 745,955

9 Claims. (Cl. 250—83.6)

This invention relates to the measurement of thickness and particularly to a method for measuring the thickness of the walls of receptacles or conduits so constructed that measurement with conventional calipers and the like is difficult, if not impossible. The invention has general application, but is particularly useful in determining thickness of boiler and still plates and the walls of boiler tubes, steel tubes and pipelines subjected to high pressures.

Many proposals have been made for measuring the wall thickness of receptacles, pipes, etc. One of such means involves the use of calipers which requires access to the inside of the vessel or pipe and therefore possesses the disadvantage of requiring the boring of holes in the receptacle, vessel or the like. Similarly, various means have been employed involving electrical or magnetic measurements for determining wall thickness without requiring penetration of the vessel or pipe. However, both electrical and magnetic methods have the serious disadvantage of depending to a large extent on the condition of strain and temperature of the material, and particularly in the case of the magnetic method upon the physical history of the specimen.

A more recent advancement in the art comprises the use of gamma rays. This method involves subjecting the particular metal, the thickness of which is to be measured, to bombardment with gamma rays which are reflected therefrom and are measured by a radiation detector such as a Geiger-Mueller counter. This method, which may be termed the back-scattered radiation method, is limited in that any of the radiation from the source which traverses the metal wall is lost and is of no avail and further in that the thickness of metal which may be measured is limited.

The present invention provides a method for measuring the thickness of materials which is independent of the strain or history of the material to be measured and which provides a greater range of measurable thicknesses than the instruments heretofore employed. Any material which contains nuclei transformable by neutron bombardment into gamma ray or positive electron emitters is susceptible to measurement by the method of my invention. Various metals, hereinafter mentioned, form important examples of this class of materials.

In general the method of measuring the thickness of tubes, plates or vessels according to my invention, comprises bombarding the wall with a neutron flux of comparatively high intensity originating at a suitable neutron source, thus creating in the wall at the point of measurement an induced radioactivity by the transmutation of a portion thereof to a radioactive isotope, and thereafter measuring the gamma rays emitted upon the decay of the radioactive isotope thus formed.

I have found that the quantum of gamma rays emitted from a mass, say a steel plate, following neutron bombardment is approximately proportional, within certain limits, to the mass. By correlating the gamma ray count with a calibrated standard it is possible to employ the gamma ray emission from the irradiated wall as an index of the thickness of the wall.

Neutron sources suitable for bombardment are available in various forms, the most commonly known being a mixture of radium and beryllium.

When neutrons impinge on suitable substances, some of them are captured and a new nucleus is formed. Under favorable conditions the newly formed nucleus is unstable and subsequently decays. This spontaneous decay may be accompanied by the emission of gamma rays or of positive electrons. Where gamma rays are emitted, they are susceptible to observation as hereinafter described. Where positive electrons are emitted, part of them will eventually combine with negative electrons from the substance. The mass of the two electrons is transformed into gamma radiation. This gamma radiation, known as annihilation radiation may be measured in like manner. Among the materials of particular importance for these processes are, iron, magnesium, aluminum, and the like, which are found in various metals either as such or as alloys.

Thus, if a neutron source of sufficient intensity is placed on the surface of an iron wall some of the iron atoms are transmuted to radioactive isotopes. The amount of radioactive atoms produced within a certain area of, for example 1 sq. inch, depends upon the thickness of the metal at that point. The greater the thickness of the metal wall, the higher will be the radioactivity per sq. inch induced therein and the greater will be the gamma ray emission from the decay of the radioactive isotopes formed in that area.

The fundamental process in the activation of iron, for example, involves the formation of manganese 56 from the iron isotope 56. Iron is existent in four isotopes of masses of 54, 56, 57 and 58 and of these the isotope 56 is susceptible to induced radioactivity by transmutation to manganese 56. The isotope 56 is most abundant of the iron isotopes and constitutes approximately 91.5% of all the iron atoms. Thus if an iron pipe, for example, is bombarded with neutrons, some of them are captured by the nuclei of the isotope Fe 56 which is thereby transformed into a manganese atom and at the same time a proton (hydrogen nucleus) is emitted. This reaction can be represented by the following equation:

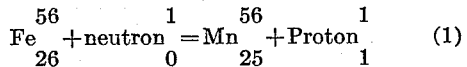

wherein the upper indices are the masses and the lower indices are the electrical charges of the various particles. Manganese 56, thus formed, spontaneously decays with the emission of an electron and a gamma ray and is thereby transformed back into an iron atom of mass 56. This process follows the equation:

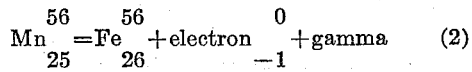

wherein again the upper indices indicated mass and the lower indices indicate electrical charge. It is this gamma ray emitted upon the decay of the artificially produced manganese isotope that is detected and used to determine the wall thickness of the particular metal vessel under consideration.

Similarly, if the wall thickness of other metal containers is desired, active isotopes, as for example, those formed by the bombardment of metals containing aluminum, magnesium or the like, may be formed and the thickness determined by measurement of the gamma rays emitted upon the disintegration of these isotopes.

Gamma ray intensity may be conveniently measured by means of an ionization chamber-type instrument in which a current flow is induced proportional in magnitude to the primary ionization produced in the chamber by incident gamma rays. In order to increase the sensitivity to incident gamma rays, the chamber is filled with a heavy inert gas at greater than atmospheric pressure. The ionization chamber method is, essentially, a measurement of the conductivity of a gas through which gamma radiation is passing. Although the current deliveries by the ionization chamber are extremely small, instruments have been developed which permit their amplification to conveniently measurable proportions.

There are other instruments for measurement of such radiation which are based upon a count of the individual incident rays, e. g. the Geiger-Mueller counter. In such instruments the primary ionization produced in a gas-filled chamber by an incident gamma ray initiates a large transitory electrical discharge, the intensity of which is independent of the magnitude of the primary ionization. These discharges are amplified and counted and the count observed per unit time is proportional to the frequency of gamma ray incidence.

Any of such counting instruments may be employed in the method of the present invention together with scaling circuits, integration circuits, mechanical counters, electrical timers or other similar auxiliary equipment useful in recording and interpreting the observations obtained from the counting instrument. The detector or counter employed in the measurements hereinafter set forth was of multiple plate construction of five inch diameter and six inch height.

The whole process therefore consists of transforming an atom in the metal in question into an active isotope under the action of neutron bombardment whereupon the active isotope spontaneously disintegrates with the emission of a gamma ray. The intensity of the gamma radiation is measured and the metal thickness can be determined therefrom based on calibration curves. The process is feasible with relation to iron, aluminum, magnesium, etc., by virtue of the fact that the respective isotopes formed have comparatively short half lives. Thus, the half life of manganese 56 is given in the literature as approximately 153 minutes. Similarly, aluminum 28 decays to silicon 28 with the emission of a gamma ray and has a half life of 2.4 minutes while magnesium 27 has a half life of 10.2 minutes.

In one test of this method, six one-half inch iron plates were stacked upon each other. On the top plate a neutron source consisting of 400 milligrams of radium admixed with beryllium was placed and kept there for sixteen hours. The neutron source was removed and the gamma ray detector was placed on the surface. The counting rate was then measured in the following way. First the top plate, i. e., the plate which was directly in contact with the neutron source was measured. The value obtained represents the activity one would obtain from the wall thickness of one-half inch. Then the second plate was slipped underneath the first plate and the activity of the two plates was measured. This measurement will, of course, correspond to a wall thickness of one inch. This procedure was repeated until the total effect of all of the plates was obtained. It follows that at various times after the neutron source was removed, due to the decay of the radioactive substance such measurements were not directly comparable, and a correction was applied to reduce the measured value to a common time. The results of these initial tests are shown on the graph of Fig. 1, and are represented by the curve labeled "measured intensity." In Fig. 1, the abscissa is laid out as the total thickness of the iron in inches and the ordinate as the gamma counts per second resulting from the measuring of the emission of gamma rays from the radioactive manganese 56. It is apparent that the insensity rises sharply to about a thickness of one and one-half inches and that thickness determinations up to this value may be made with considerably accuracy.

The same plates were then measured individually for radio-activity and the results thereof are plotted in the diagram of Fig. 2. In Fig. 2, the abscissa is laid out to show the plate number and the ordinate again to show the gamma count per second obtained from each plate. From Fig. 2 it is apparent that the uppermost plate has the highest activity and that the activity per plate decreases with an increased number of plates. This is because the neutrons which are emitted from the source have to pass through the upper layers before they can reach a lower plate.

As shown in Figs. 1 and 2, and as hereinbefore mentioned, the source employed in these experiments consisted of 400 milligrams of radium mixed with beryllium.

From the measurements of the activities of the individual plates the theoretical activity for a stack of plates can be calculated. If for example, the measurement is taken on two plates with a total thickness of one inch it would be expected, neglecting the absorption of gamma rays, that the activity would be the sum of the individual activities of the two plates. A similar summation can be made for more than two plates. Such theoretical results are plotted in Fig. 1 as the upper curve which is labeled "accumulated intensity curve." The difference between the measured intensity curve of Fig. 1, as hereinbefore discussed, and the accumulated intensity curve is due to the absorption of the gamma rays emitted from the induced radioactive isotopes in the steel of the upper layers.

An additional factor of importance in calculation of thicknesses by the method of the present invention is the determination of the optimum time of neutron bombardment. The length of the bombardment period is selected with the objective of inducing a high absolute level of isotopic activity while avoiding an unnecessarily long bombardment. In this regard it is necessary to take into consideration the fact that throughout the course of the bombardment decay of active isotopes formed in prior stages of the bombardment is taking place. For this reason the optimum bombardment period is related to the disintegration constant and the half life of the isotope or isotopes under consideration and will therefore vary with different types of metals.

It should be mentioned that the isotopic abundance, i. e., the proportion of target isotope in any metal, is only about 11% for magnesium 26 as compared to 100% for aluminum 27 and 91.5% for iron 56. For this reason the determination of a bombardment time for magnesium-containing metals will have to include consideration of the low isotopic abundance thereof. For example, when determining the optimum period of bombardment for iron pipe it is necessary to consider the half life and the decay curve of the active isotope manganese 56. In Fig. 3, there is shown a curve of the percent activity induced as related to the length of bombardment in hours. It will be seen from this curve that with the bombarding time of approximately one hour and 15 minutes, 40% of the maximum activity is obtained, for two and one-half hours, 64% is obtained and for five hours 86% is obtained. The initial periods of bombardment are more effective inasmuch as the decay of the isotopes formed in the initial stages of the bombardment has not reached the point at which the activity is becoming negligible. Thus, as the bombardment is continued for greater length of time, the initial isotopes formed will have decayed to a practically negligible value before the bombardment is ceased. For this reason, as above stated, the optimum length of bombardment will vary with different materials and with the magnitude of the neutron source.

Having described the method of my invention which presents the advantage of being insensitive to varying strains and characteristics of individual species of metals and likewise presenting the advantage of making possible the measurement of thicknesses heretofore difficult to determine, I claim:

1. The method of measuring the thickness of a metal containing an element capable of transmutation into a radioactive isotope the decay of which is accompanied by gamma ray emission which comprises bombarding said metal with a neutron flux for a measured period in excess of the half life of said radioactive isotope, removing the source of said neutron flux, counting a portion of said gamma rays originating from the decay of said radioactive isotope and calculating the thickness of said metal by comparison of the gamma ray intensity as determined by said counting with calibrated standards.

2. In measuring the thickness of a mass, the improvement which comprises bombarding a surface of the mass for a known time with neutrons emitted from a source thereof, removing the neutron source, measuring the intensity of gamma rays thereafter emitted from the surface and correlating the gamma ray intensity thus measured with a calibrated standard.

3. The method of measuring the thickness of a mass which comprises bombarding the surface of the mass with neutrons from a source thereof for a known time, removing the neutron source, measuring the intensity of the gamma rays thereafter emitted from the surface, and determining the thickness of the mass at the point of measurement by comparing the gamma ray intensity thus measured with the intensity of gamma rays emitted from a mass of known thickness after bombardment from a neutron source for a known time.

4. The method of measuring the thickness of a metal object which comprises bombarding the surface of the object with neutrons from a source thereof for a known time, removing the neutron source, measuring the intensity of the gamma rays thereafter emitted from the surface, and determining the thickness of the object at the point of measurement by comparing the gamma ray intensity thus measured with the intensity of gamma rays emitted from a metal object of a known thickness following its subjection to bombardment from a neutron source for a known time.

5. The method of measuring the thickness of a piece of iron-containing metal which comprises bombarding at least a portion of the surface of the piece with neutrons from a source thereof for a known time, removing the neutron source, measuring the intensity of gamma rays thereafter emitted from the surface bombarded, and determining the thickness of the piece at the point of measurement by comparing the gamma ray intensity thus measured with the gamma ray intensity emitted by a mass of metal of known thickness following its bombardment with neutrons from a source thereof for a known time.

6. The method of measuring the thickness of a piece of magnesium-containing metal which comprises bombarding at least a portion of the surface of the piece with neutrons from a source thereof for a known time, removing the neutron source, measuring the intensity of gamma rays thereafter emitted from the surface bombarded, and determining the thickness of the piece at the point of measurement by comparing the gamma ray intensity thus measured with the gamma ray intensity emitted by a mass of metal of known thickness following its bombardment with neutrons from a source thereof for a known time.

7. The method of measuring the thickness of a piece of aluminum-containing metal which comprises bombarding at least a portion of the surface of the piece with neutrons from a source thereof for a known time, removing the neutron source, measuring the intensity of gamma rays thereafter emitted from the surface bombarded, and determining the thickness of the piece at the point of measurement by comparing the gamma ray intensity thus measured with the gamma ray intensity emitted by a mass of metal of known thickness following its bombardment with neutrons from a source thereof for a known time.

8. In measuring the wall thickness of a metal article, the improvement which comprises successively bombarding separate areas of the surface of the article with neutrons from a source thereof for known times, removing the neutron source from each area after bombardment thereof, measuring the intensity of gamma rays from each separate area after removal of the neutron source from the area, and determining the thickness of the article adjacent each separate area by comparing the respective gamma ray intensities thus measured with the intensity of gamma rays emitted by a metal object of known thickness following its bombardment with neutrons from a source thereof for a known length of time.

9. In the measurement of the wall thickness of a metal article, the improvement which comprises successively bombarding an area on the surface of the article with neutrons from a source thereof for a known time in excess of the half life of a radioactive isotope formed in the metal during the bombardment, removing the neutron source from the area after bombardment thereof, measuring the intensity of gamma rays emitted from the area after removal of the neutron source, and determining the thickness of the article adjacent the area by comparing the gamma ray intensity thus measured with the intensity of gamma rays emitted from a metal object of known thickness following its bombardment with neutrons from a source thereof for a known time.

GERHARD HERZOG.

REFERENCES CITED

The following references are of record in the file of this patent:

UNITED STATES PATENTS

| Number | Name | Date |
| --- | --- | --- |
| 2,206,634 | Fermi et al. | July 2, 1940 |

OTHER REFERENCES

Livingood and Seaborg: Review of Modern Physics, Jan. 1940, vol. 12, pp. 30–43.